US00RE43381E

(19) United States
(12) Reissued Patent
Brockway

(10) Patent Number: US RE43,381 E
(45) Date of Reissued Patent: May 15, 2012

(54) COMPACTOR WHEEL AXLE GUARD SYSTEM

(75) Inventor: Robert J. Brockway, Scottsboro, AL (US)

(73) Assignee: Terra Compactor Wheel Corp., Scottsboro, AL (US)

(21) Appl. No.: 09/599,679

(22) Filed: Jun. 22, 2000

Related U.S. Patent Documents

Reissue of:
(64) Patent No.: 5,769,507
Issued: Jun. 23, 1998
Appl. No.: 08/732,901
Filed: Oct. 17, 1996

U.S. Applications:
(60) Provisional application No. 60/005,639, filed on Oct. 19, 1995.

(51) Int. Cl.
*B60B 15/02* (2006.01)
(52) U.S. Cl. ..... 301/43; 305/100; 172/554
(58) Field of Classification Search ..... 301/43, 301/44.1, 44.3; 305/100, 107, 110, 115; 404/121, 124, 128, 129; 172/510, 540, 554; 280/156
See application file for complete search history.

(56) References Cited

U.S. PATENT DOCUMENTS 547,794 A * 10/1895 MacPhail ..... 301/43
2,206,349 A * 7/1940 Finley ..... 404/121
2,336,959 A * 12/1943 Redman ..... 301/43 X
2,395,064 A * 2/1946 Porter ..... 301/43
3,071,050 A * 1/1963 Shatto ..... 301/43
3,650,185 A * 3/1972 Takata ..... 301/43 X
3,853,419 A * 12/1974 Bertram et al. ..... 301/43 X
3,867,052 A * 2/1975 Durham ..... 404/121
4,227,827 A * 10/1980 Arenz ..... 172/540
4,786,113 A * 11/1988 Vandenberg ..... 301/41.4
5,360,288 A * 11/1994 O'Neill et al. ..... 404/121 X
5,687,799 A * 11/1997 Greenfield et al. ..... 172/540

OTHER PUBLICATIONS

Hanomag—How to Solve Waste Disposal Problems, Hanomag Aktiengesellschaft, Hannover, Germany.
Komatsu/Hanomag CL 310 Parts Book, 3228 626 M1, (Nov. 1995).
Hanomag, Compaktor CL 310 Brochure, Hanomag Aktiengesellschaft, Hannover, Germany.
Hanomag, Compaktor CL 230 Brochure, Hanomag Aktiengesellschaft, Hannover, Germany.

* cited by examiner

*Primary Examiner* — Jason R Bellinger
(74) *Attorney, Agent, or Firm* — Ziolkowski Patent Solutions Group, SC

(57) ABSTRACT

The present invention includes an axle guard system which prevents, or at least substantially inhibits, cable, rope, wire and other refuse and debris from wrapping around the axle of a compaction machine, behind a compactor wheel mounted on the axle, during the operation of the compaction machine in compacting refuse. The compaction machine is of the type used, for example, in landfills or transfer facilities to compact (i.e., increase the density of) the refuse disposed therein. The compactor wheel comprises a hub mountable to the compaction machine axle, a rim mounted around the outer circumference of the hub, a plurality of cleats mounted to the face of the rim, and the axle guard system. The axle guard system can comprise at least one circumferential barrier extending above the face and adjacent the inner circumferential edge of the rim and/or a cleat-free area extending widthwise from the inner circumferential edge of the rim and across the rim toward the outer circumferential edge of the rim.

24 Claims, 4 Drawing Sheets

10
11
12
14
16
18
19
20
21
22
23
24
26
28
39
2

COMPACTOR WHEEL AXLE GUARD SYSTEM

Matter enclosed in heavy brackets [ ] appears in the original patent but forms no part of this reissue specification; matter printed in italics indicates the additions made by reissue.

CROSS-REFERENCE TO RELATED APPLICATIONS

This patent application claims the benefit of the provisional patent application Ser. No. 60/005,639, filed Oct. 19, 1995.

FIELD OF THE INVENTION

The present invention relates to compaction machines, such as those used to compact landfills, more particularly, to the compactor wheels on such a compaction machine and, even more particularly, to a compactor wheel having an axle guard system for guarding against refuse and debris wrapping around the axle of the compaction machine.

BACKGROUND OF THE INVENTION

Compaction machines are used to compact landfill sites, garbage dumps and other such locations. These machines typically include a self-propelled vehicle having four large wheels made of steel. Each wheel has a hub mounted to one end of an axle and a rim disposed around and radially out from the hub. The rim typically includes an outer wrapper on which a plurality of cleats are usually mounted. One problem encountered by such machines is the accumulation of waste behind the compaction wheel. Waste materials such as steel cable, wire, rope and the like have a particularly detrimental effect. Such refuse tends to wrap around the axles of the compaction machine and become trapped between the wheel and its axle, increasing the corresponding frictional forces therebetween. Increasing the friction between the wheel and its axle increases the load on the wheel propulsion system (e.g., an internal combustion engine) and reduces the life of the compaction machine. In addition, such increased frictional forces can cause the compaction wheels to wear to the point of requiring repair or even replacement of the wheels. Such wear related repairs can be very costly, and replacement wheels are very expensive.

Previously, the only way to prevent the buildup of waste behind the wheels and the corresponding premature wear and tear on the compaction machine was to periodically remove each compaction wheel so that refuse trapped between the wheel and the axle can be removed. Removing the compaction wheels on a compaction machine is a labor intensive and time consuming process. Compaction wheels can have an outside diameter of up to 84 inches and weigh up to five tons per wheel. It can take up to three working days or more to remove, clean and inspect the wheels and axles of a typical compaction machine. Such down time can result in lost income from refuse left uncompacted. In addition, trash dumping sites typically do not have backup compaction machines available to take over during the down times. The operator of, for example, a landfill risks being charged federal and state fines for each day the trash at the site remains uncompacted.

Accordingly, there is a need for a way to prevent, or at least substantially inhibit, cable, rope, wire and other refuse and debris from wrapping around the axle of a compaction machine, behind a compactor wheel mounted on the axle and, thereby, at least reduce, if not eliminate, the rate of waste buildup between a compaction wheel and its axle.

SUMMARY OF THE INVENTION

The present invention satisfies this need by providing a number of ways of preventing, or at least substantially inhibiting, cable, rope, wire and other refuse and debris from wrapping around the axle of a compaction machine, behind a compactor wheel mounted on the axle. The compaction machine is of the type used, for example, in landfills or transfer facilities to compact (i.e., increase the density of) the refuse disposed therein. The present invention provides a compactor wheel, mountable on an axle of a compaction machine, which comprises a hub mountable to the compaction machine axle, a rim mounted around the outer circumference of the hub, a plurality of cleats mounted to the face of the rim, and an axle guard system. The present axle guard system guards or protects against (i.e., prevents or at least substantially limits) refuse from wrapping around the wheel axle during the operation of the compaction machine in compacting refuse.

In one aspect of the present invention, the axle guard system comprises a cleat-free area formed circumferentially around the rim on its face. The cleat-free area extends widthwise from the inner circumferential edge of the rim and across the rim toward the outer circumferential edge of the rim at least about the width of one of the cleats.

Such a cleat-free area can be obtained by removing the inner circumferential row of cleats on the compactor wheel. Depending on how close they are to the inner edge of the wheel, the inner circumferential row of cleats tend to snag cable, rope, wire and other refuse and direct such debris into the axle area where it wraps around the wheel's axle. By removing the inner circumferential row of cleats or moving the inner row of cleats away from the inner edge of the wheel wrapper or rim, the refuse is less likely to be directed toward the axle area and end up wrapped around the axle. Alternatively, instead of actually removing or moving the inner circumferential row of cleats, the same results may effectively be obtained by extending the inner edge of the wheel rim inward toward the compaction machine. It may also be possible to obtain the desired results by a combination of so moving the inner circumferential row of cleats and extending the inner edge of the wheel rim. The extent to which the inner edge of the wheel rim is extended is dependant on the allowable clearance permitted between the compactor wheel and the compaction machine.

In an effort to effectively move the inner circumferential row of cleats away from the inner edge of the wheel rim, it may be desirable to extend the outer edge of the rim and shift all of the circumferential rows of cleats away from the inner edge of the wheel rim. It may also be desirable to extend both the inner edge and the outer edge of the wheel rim to provide the room needed to move the cleats a sufficient distance away from the axle (i.e., the inner edge of the rim) without having to remove the inner row of cleats. To provide the clearance needed to extend the inner edge of the rim, it may be desirable to use an axle that extends further out from the compaction machine body.

Especially for narrower compactor wheels (i.e., those wheels that have a width of about 35 inches or smaller), it is best not to remove the inner circumferential row of cleats, if possible. The narrower compactor wheels typically have three or four circumferential rows of cleats. The wider compactor wheels (i.e., those wheels having a width of greater than about 35 inches) typically have four or five circumferential rows of cleats and can be less affected by the loss of the inner row of cleats.

In addition to the cleat-free area, this axle guard system can further comprise one or more circumferential barriers mounted on the cleat-free area so as to extend above the face. In addition, at least one circumferential barrier can be mounted on the cleat-free area so as to extend radially outward from the face. At least one circumferential barrier can also be mounted on the cleat-free area adjacent the inner circumferential edge of the rim. Furthermore, each circumferential barrier can extend above the face of the rim to a height greater than, equal to, or less than the height of the cleats above the rim.

In another aspect of the present invention, the axle guard system comprises at least one circumferential barrier extending above the face and adjacent the inner circumferential edge of the rim. That is, at least one circumferential barrier is sufficiently near the inner circumferential edge of the rim so as to at least substantially inhibit refuse from wrapping around the axle of the compaction machine. Each circumferential barrier extends above the face of the rim to a height greater than, equal to, or less than the height of the cleats above the rim. At least one circumferential barrier can extend radially outward from the face (i.e., from the axis of rotation of the compactor wheel).

It can be desirable for at least one circumferential barrier to include some type of buttressing structure for support, in particular lateral support, against bending. This buttressing structure can be, for example, a flaring of the thickness of the at least one circumferential barrier near the face of the rim. At least one circumferential barrier can also be broadened at the face of the rim.

The at least one circumferential barrier can comprise, for example, a ring-shaped wall or a plurality of circumferentially spaced plates or fins.

For the ring-shaped barrier, the buttressing structure can be, for example, cone shaped and disposed around the outer circumference of the rim and joined, such as by welding, bolting or any other suitable technique, to the rim along a lower circumferential edge and to the ring along an upper circumferential edge. The buttressing structure can also be any other continuous structure, such as a ring-shaped plate, that provides the barrier with the desired degree of support. Instead of a continuous structure, the buttress can comprise a series of blocks or plates spaced circumferentially around the rim. Each of these blocks or plates is mounted to the rim and the ring-shaped wall, such as by welding, bolting or any other suitable technique.

If the compactor wheel has an inner row of the cleats mounted adjacent to the inner circumferential edge, it may be desirable to mount one or more of the fins to the rim between each pair of adjacent cleats forming the inner row. As with the previously described ring embodiment, if desired, each fin can be supported or reinforced with its own buttressing structure, such as one or more plates or blocks mounted to the surface of the rim and to the fin, such as by welding, bolting or any other suitable technique.

It may also be desirable for this aspect of the present axle guard system to further comprise the above described cleat-free area with the at least one circumferential barrier being mounted on the cleat-free area.

In an addition aspect of the present invention a compaction machine is provided which has at least one of the present compactor wheels mounted on an axle. The compaction machine can be a three-wheel or four-wheel type. It is desirable for all of the compactor wheels of the compaction machine to be according to the present invention. The front compactor wheel of some three-wheel type compaction machines is actually two narrow compactor wheels positioned adjacent one another with an axle therebetween. Such a front compactor wheel has two inner circumferential edges, one for each narrow wheel. For such compaction machines, it may be desirable for each inner edge to have a corresponding axle guard system.

The present invention helps to prevent cable, rope, wire and other refuse and debris from moving inward toward the inner edge of the compactor wheel and subsequently wrapping around the axle of the wheel. In addition to this advantage, the barrier cuts a line in the trash being compacted which gives the operator of the compaction machine an indication of where the last pass was made by the machine, hereby helping to ensure that each area of the landfill will be subjected to the same number of passes and to achieve complete compaction coverage. Furthermore, having this barrier extend radially out from the rim helps to stabilize the compaction machine as it moves across a sloped portion of the landfill.

The objectives, features, and other advantages of the present invention will become apparent upon consideration of the detailed description and the appended drawings.

DETAILED DESCRIPTION

Although the present invention is herein described in terms of specific embodiments, it will be readily apparent to those skilled in this art that various modifications, rearrangements, and substitutions can be made without departing from the spirit of the invention. The scope of the present invention is thus only limited by the claims appended hereto.

Figures 1, 2, 3:
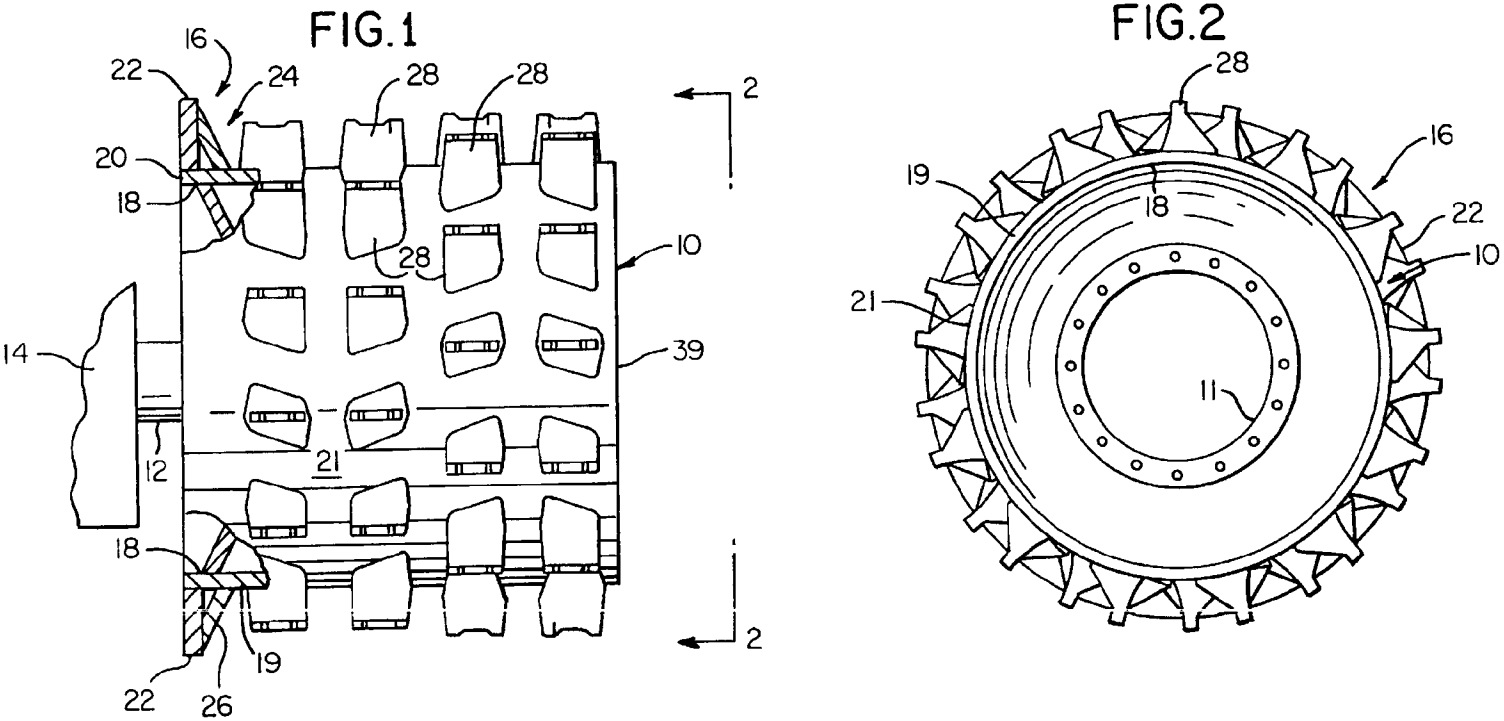
FIG. 1 is a front view of a compactor wheel, partially broken away at two locations, mounting a ring-shaped barrier that is taller than the cleats mounted thereon, according to one embodiment of the present invention.
FIG. 2 is an outer edge view of the compactor wheel of FIG. 1 taken along the lines 2-2, with a ring-shaped barrier that is shorter than the cleats.
FIG. 3 is a front view of a portion of a compactor wheel, partially broken away, showing one of a number of alternative buttressing structures for the ring-shaped and the plate-type barrier of the present invention.

Referring to FIGS. 1 and 2, a compactor wheel 10 is shown mounted on the axle 12 of a compaction machine 14, such as those disclosed in U.S. Pats. Nos. 3,340,783, filed Jul. 12, 1965; 4,530,620, filed Jul. 23, 1985; and 5,358,355, filed Oct. 25, 1995, which are incorporated by reference herein, in their entirety. The wheel 10 includes a hub 11 adapted, for example, with a plurality of bolt holes for being bolted or otherwise mounted to the axle 12. A rim 18 is mounted around the hub 11. The rim 18 includes a wrapper 19 with an outer face or surface 21 on which a plurality of cleats 28 are mounted, such as by welding or any other suitable technique. The wheel 10 also includes an axle guard system such as, for example, a circumferential barrier 16 which extends radially out from the wrapper 19 of the rim 18 near the inner circumferential edge 20 of the wheel 10. This barrier 16 can be made of any suitable material such as, for example, steel.

Figure 5:
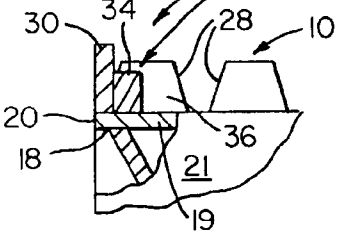
FIG. 5 is a front view of a portion of a compactor wheel, partially broken away, showing another of a number of alternative buttressing structures for the ring-shaped and the plate-type barrier of the present invention.
Figure 4:
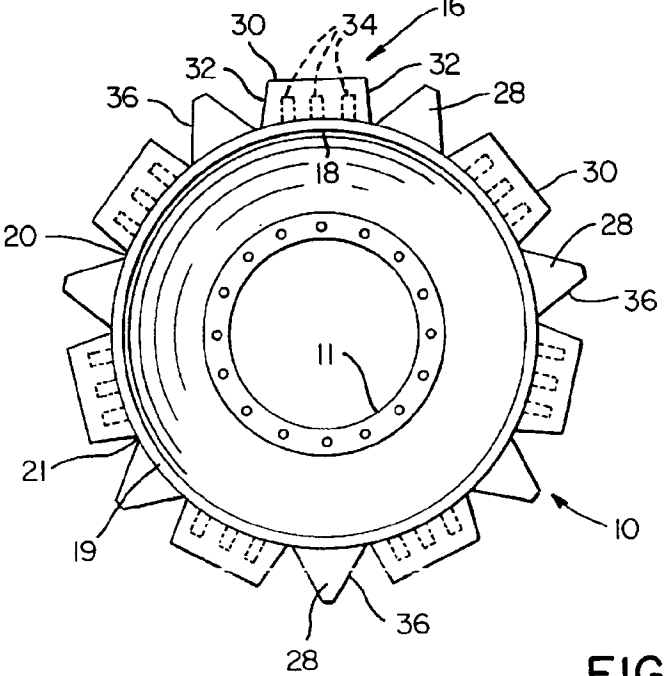
FIG. 4 is an inner edge view of a compactor wheel with a plurality of plate-type barrier fins mounted thereon in a circumferentially spaced manner between the cleats in the inner row of cleats, according to an alternative embodiment of the present invention.

The barrier 16 extends radially out from the rim 18 to a height above (e.g., as shown in FIGS. 1, 3 and 5), equal to, or below (e.g., as shown in FIGS. 2 and 4) the cleats 28 mounted on the wheel 10. It is believed that desirable results may be obtained using a barrier 16 having a height in the range of about 1 inch to about 8 inches. For a wheel 10 with cleats 28 each having a height of about 6 to 7 inches, satisfactory results have been obtained using a barrier 16 having a height of about 4 inches and a thickness of about 2 inches.

The barrier 16 shown in FIGS. 1 and 2 comprises a single ring-shaped wall 22 mounted circumferentially around the wrapper 19 of the rim 18. It can be desirable for the ring 22 to be supported or reinforced by some kind of buttressing structure 24 to, for example, help prevent the ring 22 from being bent or knocked off during the operation of the compaction machine 14. The need for such a buttressing structure 24 reduces, for example, as the height of the barrier 16 decreases. The need for a buttress 24 also reduces, for example, as the thickness of the barrier 16 increases. The buttressing structure 24 can be a flaring or broadening 23 of the thickness of the ring 22 where the ring 22 is mounted to the rim 18 (see FIG. 3). The buttressing structure 24 can also be structure separate from the ring 22 such as, for example, a truncated cone-shaped ring 26 mounted around the outer circumference of the wrapper 19 and joined, such as by welding, bolting or any other suitable technique, to the surface 21 of the wrapper 19 along a lower circumferential edge and to the ring-shaped wall 22 along an upper circumferential edge.

The buttressing structure 24 can also be any other continuous structure, such as a ring-shaped plate, that provides the barrier 16 with the desired degree of support. Instead of a continuous structure, the buttress 24 can comprise a series of blocks or plates 34 spaced circumferentially around the wrapper 19. Each of these blocks or plates 34 is mounted to the wrapper 19 and the ring-shaped wall 22, such as by welding, bolting or any other suitable technique.

Referring to FIG. 4, the circumferential barrier 16 can also comprise a series of spaced plate-type barriers or fins 30 mounted circumferentially around the wheel rim 18 near its inner edge 20. It can be desirable for one or more of the fins 30 to be located between the cleats 28 on the inner circumferential row 36 as shown, for example, in FIGS. 4 and 5. It is desirable for each fin 30 to include tapered edges 32 to inhibit snagging debris with the fins 30. It can also be desirable for each of the fins 30 to be flared in thickness at their base for support (e.g., as shown in FIG. 3 for ring 22) or be supported with a separate buttressing structure 24 such as one or more of the blocks or plates 34 (see FIG. 5) mounted to the wrapper 19 and each of the fins 30. The one or more blocks or plates 34 can also be used to support the ring-shaped barrier 22.

Figure 6:
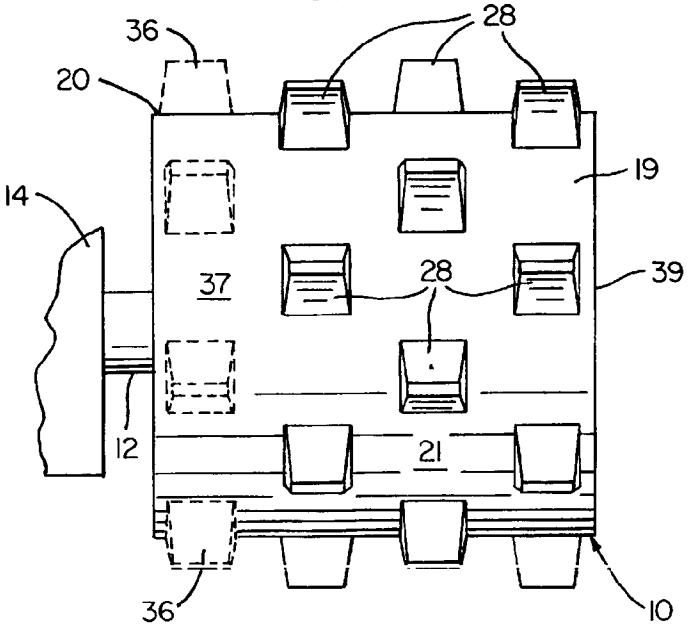
FIG. 6 is a front view of a compactor wheel with its inner circumferential row of cleats removed to form a cleat-free area according to the present invention.

Referring to FIG. 6, the axle guard system of the present invention can comprise a cleat-free area 37 formed on the face 21 of the wrapper 19. The area 37 extends up to about 10 inches from the inner edge 20. The cleat-free area 37 can be formed, for example, by removing the inner circumferential row 36 (shown in phantom) of the cleats 28. As an alternative to removing them, it may be desirable to move the inner row 36 of the cleats 28 away from the inner edge 20. Depending on how close they are to the inner edge 20 of the wheel 10, the inner circumferential row 36 of the cleats 28 tend to push refuse toward the wheel's axle 12. By removing the inner circumferential row 36 of the cleats 28 or moving the inner row 36 away from the inner edge 20 of the wheel wrapper 19, the refuse is less likely to be pushed toward the axle 12 and end up wrapped around the axle 12.

Instead of actually removing or moving the inner circumferential row 36 of the cleats 28, the same results may effectively be obtained by extending the inner edge 20 of the wheel wrapper 19 toward the compaction machine 14. It may also be possible to obtain the desired results by doing a combination of moving the inner circumferential row 36 of the cleats 28 and extending the inner edge 20 of the wheel wrapper 19. The extent to which the inner edge 20 of the wheel wrapper 19 is extended is dependant on the allowable clearance permitted between the compactor wheel 10 and the compaction machine 14.

In an effort to effectively move the inner circumferential row 36 of the cleats 28 away from the inner edge 20 of the wheel wrapper 19, it may be desirable to extend the outer edge 20 of the wrapper 19 and shift all of the circumferential rows of the cleats 28, including the innermost row 36, away from the inner edge 20 of the wheel wrapper 19. It may also be desirable to extend both the inner circumferential edge 20 and the outer circumferential edge 39 of the wheel wrapper 19 to provide the room needed to move the cleats 28 a sufficient distance away from the axle 12 (i.e., the inner edge 20 of the wrapper 19) without having to remove the inner row 36 of the cleats 28. Especially for narrower compactor wheels 10 (i.e., those wheels that have a width, from edge 20 to edge 39, of about 35 inches or smaller), it is best not to remove the inner circumferential row 36 of the cleats 28, if possible. The narrower compactor wheels 10 typically have only three circumferential rows of the cleats 28. The wider compactor wheels 10 (i.e., those wheels having an edge to edge width of greater than about 35 inches) typically have four to five circumferential rows of the cleats 28 and are less affected by the loss of the inner row 36 of the cleats 28.

When a ring-shaped barrier 22 is used with a wider compactor wheel 10, it can be desirable to remove the inner row of chats 28 and replace them with the ring-shaped barrier 22.

Figure 7A:
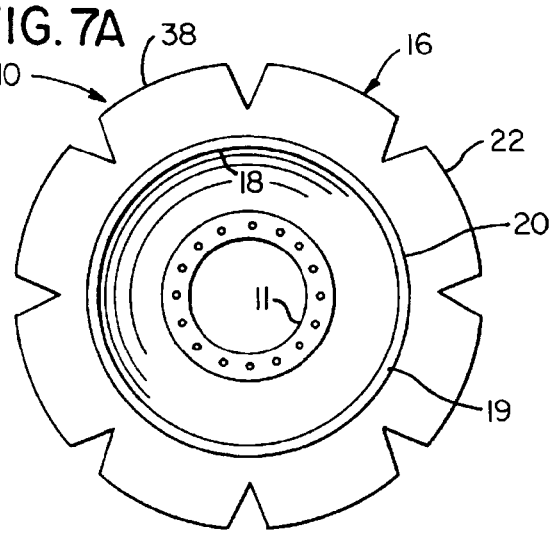
FIG. 7A is an inner edge view of one embodiment of a compactor wheel with a V-notched ring-shaped barrier according to the present invention.
Figure 7B:
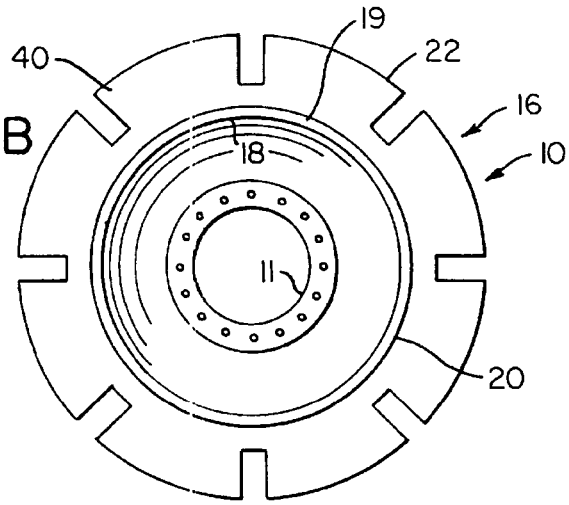
FIG. 7B is an inner edge view of another embodiment of a compactor wheel with a rectangle-notched ring-shaped barrier according to the present invention.
Figure 7C:
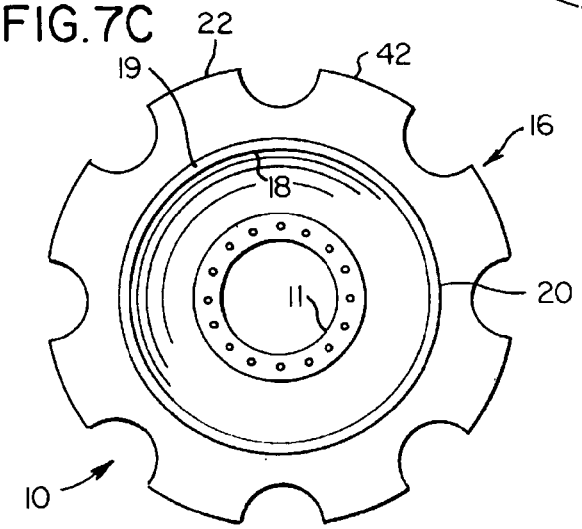
FIG. 7C is an inner edge view of an additional embodiment of a compactor wheel with a round-notched ring-shaped barrier according to the present invention.

Referring to FIGS. 7A-7C, the ring-shaped barrier 22 can also be a V-notched ring-shaped barrier 38, with a plurality of V-shaped notches spaced along the outer circumference of the ring 38, a rectangle-notched ring-shaped barrier 40, with a plurality of rectangular-shaped notches spaced along the outer circumference of the ring 40, or a round-notched ring-shaped barrier 42, with a plurality of round-shaped notches spaced along the outer circumference of the ring 42.

Figure 8A:
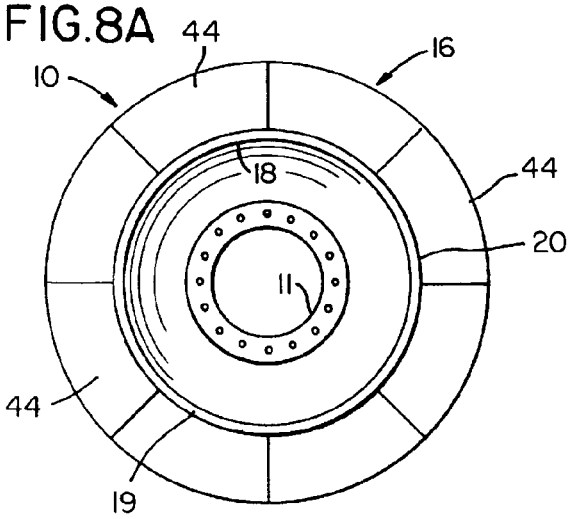
FIG. 8A is an inner edge view of a further embodiment of a compactor wheel with a staggered plate-type barrier according to the present invention.
Figure 8B:
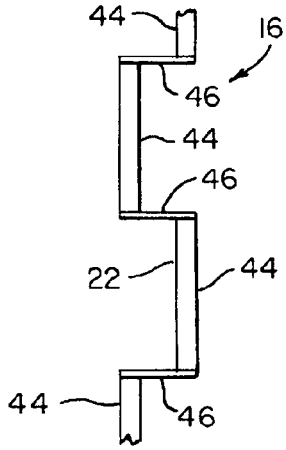
FIG. 8B is a top plan view of a section of the plate-type barrier of FIG. 8A, With the barrier section laid out lengthwise.

Referring to FIGS. 8A and 8B, instead of the barrier 16 comprising a plurality of separate spaced fins 30, the barrier 16 can comprise a series of plate-type barriers or fins 44 that are connected to one another from end to end. For example, as shown in FIG. 8B, each fin 44 is connected at either end to an adjacent fin 44 by a connecting plate 46. Every other fin 44 is also positioned widthwise on the wrapper 19 from the other fins 44 so as to form two lines of staggered fins 44 around the circumference of the wrapper 19. In addition to providing the benefits of a barrier 16, it is believed that the connecting plates 46 will also provide addition traction for the wheel 10.

Figure 9:
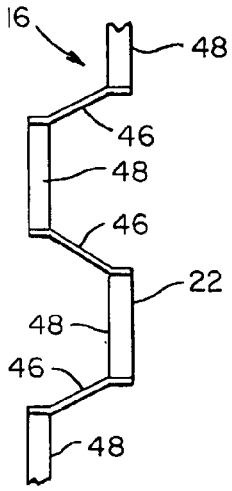
FIG. 9 is a top plan view of a section of an alternative embodiment of the staggered plate-type barrier of FIG. 8A, with the barrier section laid out lengthwise.

Referring to FIG. 9, an alternative embodiment of the staggered plate-type barrier 16 of FIGS. 8A and 8B can include fins 48 which are circumferentially spaced apart from one another, as well as having every other fin 48 positioned widthwise from the other fins 48. This alternative barrier 16 also forms two lines of staggered fins 48 around the circumference of the wrapper 19.

Figure 10:
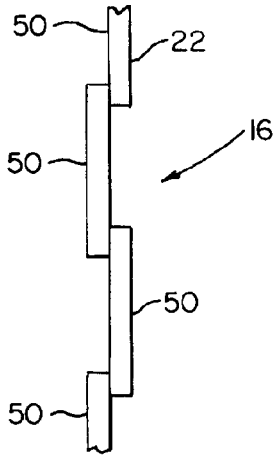
FIG. 10 is a top plan view of a section of an overlapping plate-type barrier, according to the present invention, with the barrier section laid out lengthwise.

Referring to FIG. 10, as an alternative, instead of being connected by connecting plates 46, the barrier 16 can be an overlapping plate-type barrier formed by a plurality of fins 50 which overlap and are connected at their ends.

The present invention helps to prevent cable, rope, wire and other refuse and debris from moving inward toward the inner edge 20 of the compactor wheel 10 and subsequently wrapping around the axle 12 of the compaction machine 14. In addition to this advantage, the barrier 16 can cut a line in the trash being compacted which gives the operator of the compaction machine 14 an indication of where the last pass was made by the machine 14, thereby helping to ensure that each area of the landfill will be subjected to the same number of passes and to achieve complete compaction coverage. Furthermore, having this barrier 16 extend radially out from the wrapper 19 helps to stabilize the compaction machine 14 as it moves across a sloped portion of the landfill.

From the above disclosure of the general principles of the present invention and the preceding detailed description, those skilled in this art will readily comprehend the various modifications to which the present invention is susceptible. Therefore, the scope of the invention should be limited only by the following claims and equivalents thereof.

What is claimed is:

1. A compactor wheel mountable on an axle of a compaction machine, said compactor wheel comprising:

a hub mountable to an axle of a compaction machine;

a rim mounted around the outer circumference of said hub, said rim having a face and an inner circumferential edge and an outer circumferential edge;

a plurality of compaction cleats circumferentially spaced on, transversely spaced across and mounted to said face of said rim; and an axle guard system comprising a cleat-free area formed circumferentially around said rim on said face and extending widthwise from said inner edge across said rim toward said outer edge at least about the width of one of said cleats.

2. The compactor wheel as set forth in claim 1, wherein said axle guard system further comprises at least one circumferential barrier mounted on said cleat-free area so as to extend above said face.

3. The compactor wheel as set forth in claim 2, wherein said at least one circumferential barrier is mounted on said cleat-free area so as to extend radially outward from said face.

4. The compactor wheel as set forth in claim 2, wherein said at least one circumferential barrier is mounted on said cleat-free area adjacent said inner circumferential edge of said rim.

5. The compactor wheel as set forth in claim 2, wherein each of said cleats has a height, and said at least one circumferential barrier extends above said face a height greater than the height of said cleats.

6. A compactor wheel mountable on an axle of a compaction machine having a body suitable for compacting refuse, said compactor wheel comprising:

a hub mountable to an axle of a compaction machine;

a rim mounted around the outer circumference of said hub, said rim having a face and an inner circumferential edge and an outer circumferential edge;

a plurality of compactor wheel cleats circumferentially spaced on, transversely spaced across, and mounted to the face of said rim *in a given orientation*; and an axle guard system comprising at least one circumferential barrier extending above said face and adjacent said inner circumferential edge of said rim *and located in an area absent any of the compactor wheel cleats in the given orientation*, wherein said compactor wheel is suitable for supporting the body of a compaction machine.

7. The compactor wheel as set forth in claim 6, wherein said at least one circumferential barrier extends radially outward from said face.

8. The compactor wheel as set forth in claim 6, wherein said at least one circumferential barrier comprises a ring-shaped wall.

[9. The compactor wheel as set forth in claim 6, wherein said at least one circumferential barrier comprises a plurality of circumferentially spaced fins.]

[10. The compactor wheel as set forth in claim 9, wherein said compactor wheel has an inner row of said cleats mounted adjacent to said inner circumferential edge, one of said fins is mounted to said rim between each pair of adjacent cleats forming said row.]

11. The compactor wheel as set forth in claim [10] *6*, wherein said at least one circumferential barrier includes buttressing structure for support.

12. The compactor wheel as set forth in claim 11, wherein said buttressing structure is a broadening of said at least one circumferential barrier at said face of said rim.

[13. The compactor wheel as set forth in claim 6, wherein said axle guard system further comprises a cleat-free area formed circumferentially around said rim on said face and extending widthwise from said inner edge across said rim toward said outer edge at least about the width of one of said cleats, said at least one circumferential barrier being mounted on said cleat-free area.]

14. A compaction machine comprising:

a body suitable for compacting refuse, said body having opposite sides;

an axle having two ends and mounting said body; and a compactor wheel mounted on each end of said axle, one compactor wheel on each side of said body, each said compactor wheel comprising:

a hub mounted to one end of said axle, a rim mounted around the outer circumference of said hub, said rim having a face, an inner circumferential edge adjacent to one side of said body and an outer circumferential edge, a plurality of cleats circumferentially spaced on and mounted to said face of said rim, and an axle guard system comprising [at least one] *a* circumferential barrier extending above said face and adjacent said inner circumferential edge of said rim, *wherein the circumferential barrier has a face that is substantially perpendicular to the axle.*

15. The [compactor wheel] *compaction machine* as set forth in claim 14, wherein said at least one circumferential barrier comprises a ring-shaped wall.

16. The [compactor wheel] *compaction machine* as set forth in claim 14, wherein said at least one circumferential barrier comprises a plurality of circumferentially spaced fins.

17. The [compactor wheel] *compaction machine* as set forth in claim 16, wherein said compactor wheel has an inner row of said cleats mounted adjacent to said inner circumferential edge, one of said fins is mounted to said rim between each pair of adjacent cleats forming said row.

18. The [compactor wheel] *compaction machine* as set forth in claim 17, wherein said at least one circumferential barrier includes buttressing structure for support.

19. The [compactor wheel] *compaction machine* as set forth in claim 18, wherein said buttressing structure is a broadening of said at least one circumferential barrier at said face of said rim.

20. The [compactor wheel] *compaction machine* as set forth in claim 14, wherein said axle guard system further comprises a cleat-free area formed circumferentially around said rim on said face and extending widthwise from said inner edge across said rim toward said outer edge at least about the width of one of said cleats, said at least one circumferential barrier being mounted on said cleat-free area.

*21. A compaction machine comprising:*

*a body suitable for compacting refuse, said body having opposite sides;*

*an axle having two ends and mounting said body; and*

*a compactor wheel mounted on each end of said axle, one compactor wheel on each side of said body, said compactor wheel comprising:*

*a hub mountable to said axle;*

*a rim mounted around the outer circumference of said hub, said rim having a face, an inner circumferential edge adjacent to one side of said body, and an outer circumferential edge;*

*a plurality of tooth-shaped compaction cleats circumferentially spaced on, transversely spaced across and mounted to said face of said rim; and*

*an axle guard system comprising a cleat-free area formed circumferentially around said rim on said face and extending widthwise from said inner edge across said rim toward said outer edge a distance to reduce refuse accumulation about the axle of the compaction machine.*

*22. A compaction machine comprising:*

*a body suitable for compacting refuse, said body having opposite sides;*

*two axles, each axle having two ends and mounting said body; and*

*a compactor wheel mounted on each end of each of said axles, each said compactor wheel comprising:*

*a hub mountable to said axle;*

*a rim mounted around the outer circumference of said hub, said rim having a face, an inner circumferential edge adjacent to one said of said body, and an outer circumferential edge;*

*a plurality of compaction cleats circumferentially spaced on, transversely spaced across and mounted to said face of said rim; and*

*an axle guard system comprising a cleat-free area formed circumferentially around said rim on said face and extending widthwise from said inner edge across said rim toward said outer edge for reducing movement of cable, ropes, or wire refuse inward toward said inner circumferential edge of said rim.*

*23. The compaction machine as set forth in claim 21, wherein said cleat-free area extends widthwise from said inner edge across said rim toward said outer edge up to about 10 inches.*

*24. A compactor wheel mountable on an axle of a compaction machine having a body suitable for compacting refuse, said compactor wheel comprising:*

*a hub mountable to an axle of a compaction machine;*

*a rim mounted around the outer circumference of said hub, said rim having a face and an inner circumferential edge and an outer circumferential edge;*

*a plurality of compactor wheel cleats circumferentially spaced on, transversely spaced across, and mounted to the face of said rim in an orientation that is substantially parallel to the axle of the compaction machine; and*

*an axle guard system comprising an area free of the plurality of compactor wheel cleats and at least one circumferential barrier extending above said face and adjacent said inner circumferential edge of said rim in an area of said rim absent any of the cleats in the given orientation, wherein said compactor wheel is suitable for supporting the body of a compaction machine.*

*25. A compactor wheel mountable on an axle of a compaction machine having a body suitable for compacting refuse, said compactor wheel comprising:*

*a hub mountable to an axle of a compaction machine;*

*a rim mounted around the outer circumference of said hub, said rim having a face and an inner circumferential edge and an outer circumferential edge;*

*a plurality of compactor wheel cleats circumferentially spaced on, transversely spaced across, and mounted to the face of said rim; and*

*an axle guard system comprising at least one circumferential barrier extending above said face and adjacent said inner circumferential edge of said rim, wherein said compactor wheel is suitable for supporting the body of a compaction machine, and wherein said at least one circumferential barrier comprises a ring-shaped wall.*

*26. A compactor wheel mountable on an axle of a compaction machine having a body suitable for compacting refuse, said compactor wheel comprising:*

*a hub mountable to an axle of a compaction machine;*

*a rim mounted around the outer circumference of said hub, said rim having a face and an inner circumferential edge and an outer circumferential edge;*

*a plurality of compactor wheel cleats circumferentially spaced on, transversely spaced across, and mounted to the face of said rim; and*

*an axle guard system comprising at least one circumferential barrier extending above said face and adjacent said inner circumferential edge of said rim, wherein said compactor wheel is suitable for supporting the body of a compaction machine, wherein said at least one circumferential barrier comprises a plurality of circumferentially spaced fins, and wherein said compactor wheel has an inner row of said cleats mounted adjacent to said inner circumferential edge, one of said fins is mounted to said rim between each pair of adjacent cleats forming said row.*

*27. A compactor wheel mountable on an axle of a compaction machine having a body suitable for compacting refuse, said compactor wheel comprising:*

*a hub mountable to an axle of a compaction machine;*

*a rim mounted around the outer circumference of said hub, said rim having a face and an inner circumferential edge and an outer circumferential edge;*

*a plurality of compactor wheel cleats circumferentially spaced on, transversely spaced across, and mounted to the face of said rim; and*

*an axle guard system comprising at least one circumferential barrier extending above said face and adjacent said inner circumferential edge of said rim, wherein said compactor wheel is suitable for supporting the body of a compaction machine, and wherein said axle guard system further comprises a cleat-free area formed circumferentially around said rim on said face and extending widthwise from said inner edge across said rim toward said outer edge at least about the width of one of said cleats, said at least one circumferential barrier being mounted on said cleat-free area.*

* * * * *